United States Patent [19]

Weber et al.

[11] Patent Number: 5,245,704
[45] Date of Patent: Sep. 14, 1993

[54] SYSTEM FOR SHARING DATA BETWEEN MICROPROCESSOR BASED DEVICES

[75] Inventors: Mark S. Weber, Germantown; Joseph T. Bronikowski, Milwaukee; Brian T. Hill, Mequon; David J. Sackmann, Milwaukee, all of Wis.

[73] Assignee: Square D Company, Palatine, Ill.

[21] Appl. No.: 497,461

[22] Filed: Mar. 22, 1990

[51] Int. Cl.⁵ ............................................. G06F 15/46
[52] U.S. Cl. ............................... 395/200; 364/136; 364/DIG. 2; 364/926.9; 364/940.9; 364/949; 364/940.62
[58] Field of Search .................. 395/200; 364/136

[56] References Cited

U.S. PATENT DOCUMENTS

| | | | |
|---|---|---|---|
| 4,402,046 | 8/1983 | Cox et al. | 364/200 |
| 4,835,674 | 5/1989 | Collins et al. | 364/200 |
| 4,897,777 | 1/1990 | Janke et al. | 364/900 X |
| 4,926,375 | 5/1990 | Mercer et al. | 364/900 |
| 5,072,374 | 12/1991 | Sexton et al. | 364/DIG. 1 |
| 5,131,092 | 7/1992 | Sackmann et al. | 364/DIG. 2 |

Primary Examiner—Thomas M. Heckler
Attorney, Agent, or Firm—Larry I. Golden; Michael J. Femal; Richard J. Graefe

[57] ABSTRACT

A system allows for transferring messages between microprocessor based devices, such as programmable logic controllers (PLC), and a host computer over an Ethernet communications network. At the host computer level, these messages can be directed globally or locally. The host computer can immediately obtain messages from a programmable logic controller without interruption of the execution of the PLC's ladder program. The host computer can also receive unsolicited messages from the PLC.

9 Claims, 4 Drawing Sheets

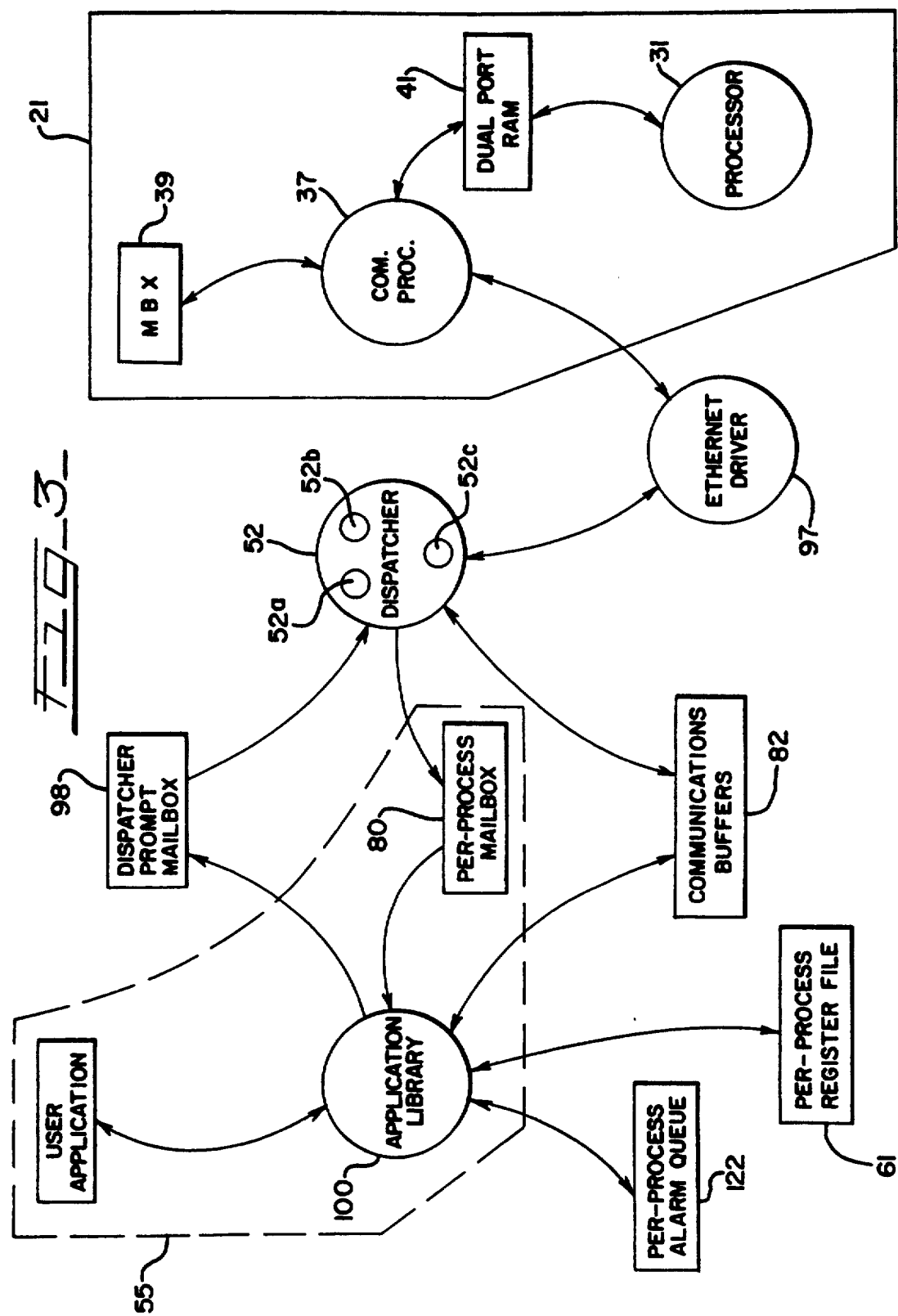

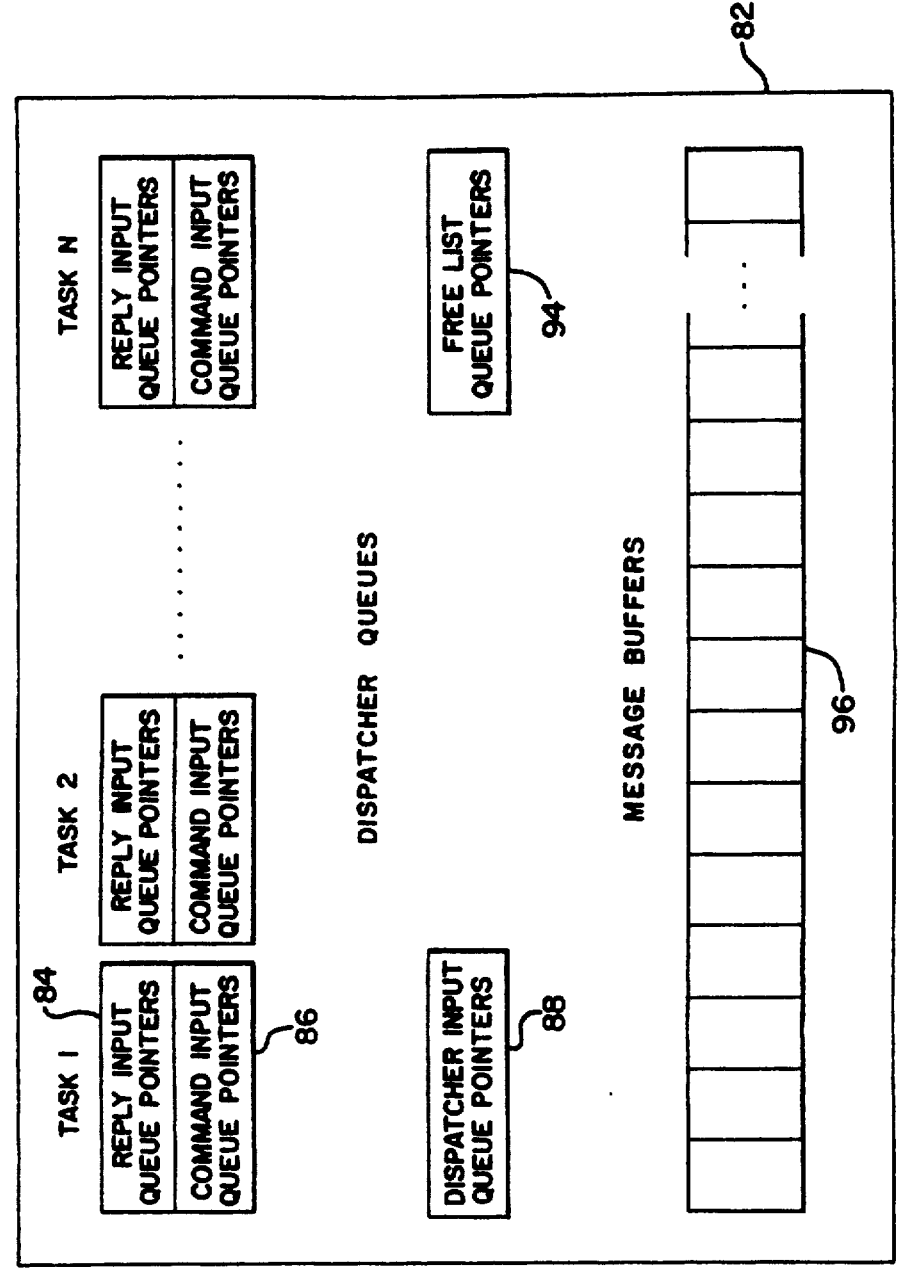

SYSTEM FOR SHARING DATA BETWEEN MICROPROCESSOR BASED DEVICES

DESCRIPTION

Technical Field

Applicants' invention relates to microprocessor based devices and, more particularly, to a system to permit data sharing between microprocessor based devices and host computers.

RELATED APPLICATIONS

This application is related to the following commonly assigned copending applications, all filed on Mar. 22, 1990: U.S. application Ser. No. 07/497,451 "An Equivalent Network Interface Module for Connecting a Programmable Logic Controller to a High Speed Communications Network", now U.S. Pat. No. 5,151,978; U.S. application Ser. No. 07/500,323, "A System for Processing Alarm Notifications in Microprocessor Based Devices", now U.S. Pat. No. 5,163,151; U.S. application Ser. No. 07/497,465, "Apparatus for Networking Programmable Logic Controllers to Host Computers"; and U.S. application Ser. No. 07/497,455, "Emulation of a Programmable Logic Controller by a Host Computer".

BACKGROUND PRIOR ART

As industrial automation advances, interconnectivity between various microprocessor based plant floor devices, such as programmable logic controllers ("PLCs"), and plant computers, becomes more and more desirable. For example, the extensive math and register commands of a PLC can perform data preprocessing on raw data right at the raw data's point of origin, as opposed to uploading all of the raw data to the host computer, thereby permitting use of a smaller host computer.

Various schemes have been developed to interconnect PLCs and host computers, but their applications have been limited. For example, if one wanted to communicatively couple three PLCs in the absence of a network, each PLC would typically require a separate serial, or point to point, connection with each of the other two PLCs. However, the speed of serial communication is limited. Further, as the number of interconnected PLCs grows linearly, the number of serial connections grows geometrically.

In a commonly assigned co-pending patent application, Ser. No. 180,093, a peer-to-peer system is disclosed for interconnecting a plurality of PLCs. However this system requires a dedicated communication network.

Allen-Bradley Company, Inc., in conjunction with Digital Equipment Corporation ("DEC") has developed a system marketed under the trade name "Pyramid Integrator" for interconnecting devices over the relatively standardized Ethernet network via DEC's VAX ® computer. However according to this system, only a maximum of four PLCs can be coupled to an Ethernet network per VAX computer, and each of the PLCs must be plugged into the backplane of the VAX computer. If five PLCs are required on the Ethernet, two VAX computers are required. This greatly adds to the expense of automation.

In addition, a host computer can concurrently perform a plurality of applications programs, or user tasks. When a PLC is connected to such a host computer, it is often important for the host computer to obtain data from the PLC. Typically this is accomplished by having the host computer poll the PLC. However, this polling either requires the host computer to interrupt the PLC's processing of its ladder program, or it requires the host computer to wait for the PLC to complete a scan of its ladder program. Further it is often important for the PLC to send unsolicited information to the host computer.

Messages typically are transmitted between microprocessor based devices on an Ethernet network in the form of data packets. The data packets generally include a preamble portion comprising routing information and protocol type, a user defined portion comprising the message itself, and an error detection portion. As the speed of communication between microprocessor based devices increases, error detection operations become ever more critical. Typically the error detection operation views the entire data packet to determine existence of an error. This often does not quickly enough detect errors in the user data portion. Further, the protocol often cannot accurately respond to lost messages.

Finally as automated systems control ever larger operations, handling and prioritizing of event notifications or alarms, such as faults, alerts and warnings, by the host computer becomes even more important. While certain host computers have been able to receive alarms, they have been received on a global basis, rather than individually on a user task basis.

Applicants' invention is provided to solve these and other problems.

SUMMARY OF THE INVENTION

It is an object of the invention to provide an apparatus for interconnecting PLCs and other microprocessor based devices over a high speed communications network, such as Ethernet.

It is a further object of the invention to provide a system wherein a host computer can immediately obtain data from a PLC without interrupting execution of the PLC's ladder program and wherein the host computer can receive unsolicited information from the PLC.

It is a still further object of the invention to provide a communication protocol including high speed error detection of the user data portion of a data packet.

It is yet another object of the invention to provide a communication protocol which can accurately respond to lost messages.

Finally, it is an object of the invention to provide a system which prioritizes alarms, such as faults, alerts and warnings, while also allowing for an essentially unlimited number of alarms per queue.

Other features and advantages of the invention will be apparent from the following specification taken in conjunction with the following drawings.

BRIEF DESCRIPTION OF DRAWINGS

FIG. 3 is a software data flow diagram illustrating important elements in the communications architecture of the system; and FIG. 4 is a graphic illustration of the communication buffer of FIG. 3.

DETAILED DESCRIPTION

Figure 1:
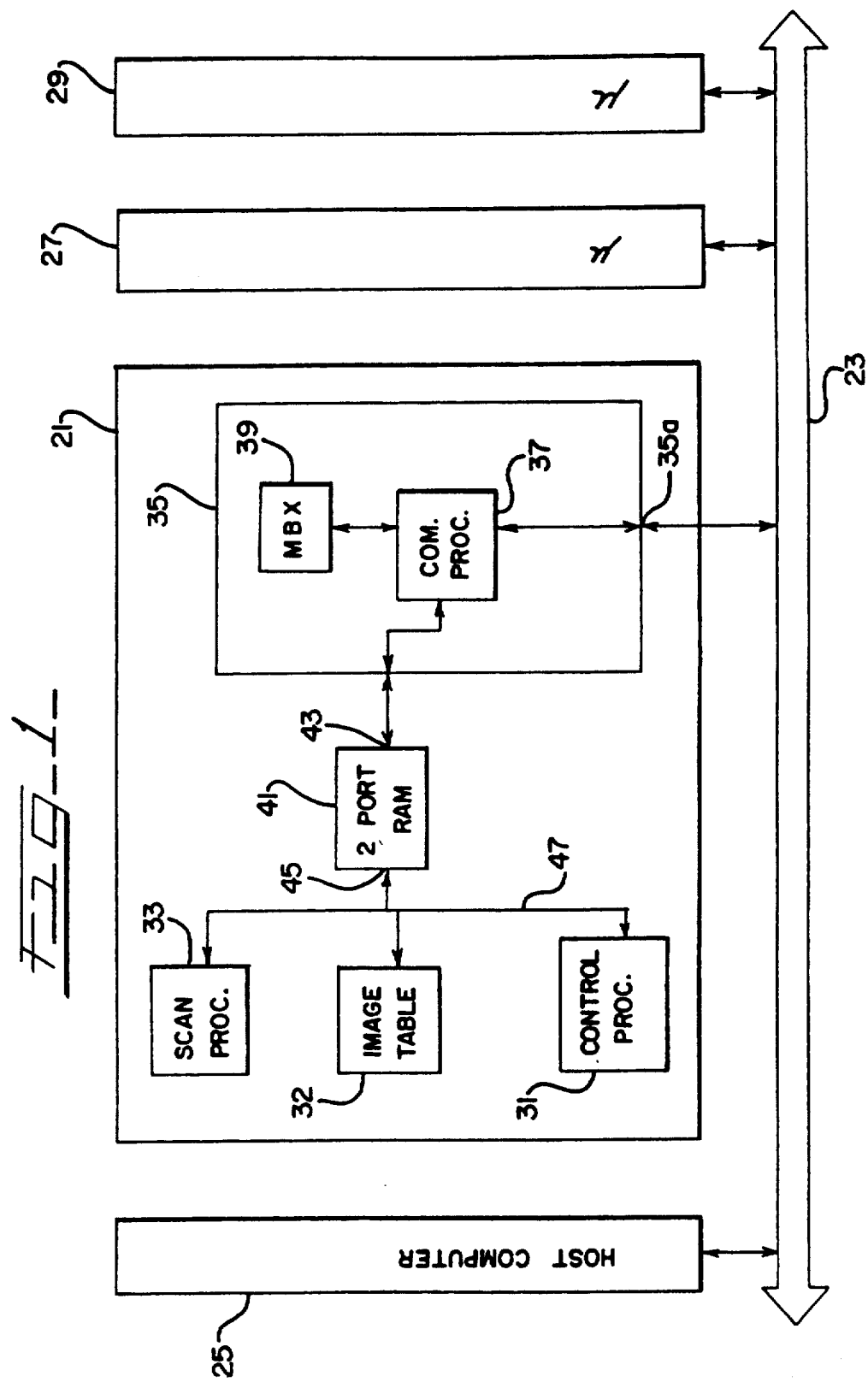
FIG. 1 is a block diagram of a plurality of microprocessor based devices coupled to a high-speed communications network.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the particular embodiment illustrated.

A first programmable logic controller ("PLC") 21 coupled to a high-speed data communications network 23 is illustrated in FIG. 1. Other microprocessor based devices such as a host computer 25 or other microprocessor based devices 27, 29 can also be coupled to the communications network 23. The host computer 25 can be a VAX ® computer, sold by the Digital Equipment Corporation, and the PLC 21 can be a SY/-MAX ® Model 650 programmable controller, sold by Square D Company, assignee of this patent application.

The communications network 23 comprises a Thin Wire Ethernet (Type 10BASE2) 10M baud network. The host computer 25 can couple directly to the Thin Wire Ethernet network with an appropriate Thin Wire Ethernet interface (not shown), or it can attach to a standard Ethernet (Type 10BASE5) network which is then connected through a repeater (not shown) to the Thin Wire Ethernet network.

Up to 100 microprocessor based devices can be connected to the communications network 23. A standard Thin Wire Ethernet network may have up to 30 devices attached. If a multi-port Thin Wire repeater is used, however, each of the repeater ports can have a 29-device network attached. All the Thin Wire and standard Ethernet networks connected through the repeater are logically part of the same network, therefore drop numbers (discussed below) used must be unique across the whole network. This is how up to 100 microprocessor based devices can be connected to the one communications network 23.

One such repeater is a DEC model DEMPR-AA multi-port repeater which has one 15-pin transceiver cable connector and eight Thin Wire connectors. Another repeater is a DEC model DESPR-AA single-port repeater, which has one 15-pin transceiver cable connector and one Thin Wire connector. The 15-pin transceiver cable is used to connect the repeaters to a standard thick-wire Ethernet. The DEMPR-AA and DESPR-AA count as one Thin Wire network drop on each network to which they are attached, so up to 29 microprocessor based devices can be attached to each port. The repeaters do not require drop numbers.

The first PLC 21 includes a control processor 31 (Motorola 68010), an image table 32 and a scan processor 33 (AMD 29116). Traditionally PLCs have required a separate network interface module (or "NIM") in order to communicate on a high-speed communications network such as Ethernet. In accordance with one aspect of the invention, the first PLC 21 includes an equivalent network interface module (ENIM) 35. The ENIM 35 comprises a communications processor 37 (Motorola 68010) and random access memory operable as an ENIM mailbox register 39. As discussed below, the ENIM 35 is coupled to the communications network 23 via a first port 35a.

A two-port RAM 41 has first and second ports 43, 45, respectively. The first port 43 is coupled to the ENIM 35. The second port 45 is coupled to a data bus 47. The data bus 47 is also coupled to the control processor 31, the image table 32 and the scan processor 33. The control processor 31 accesses the two-port RAM 41 via the data bus 47. The control processor 31 transfers data from the two-port RAM 41 to the image table 32, which is accessed by the scan processor 33. Thus, the ENIM 35 and the control processor 31 exchange data via the two-port RAM 41.

The mailbox register 39 provides random access registers to permit the first PLC 21 to receive unsolicited messages from other devices coupled to the communication network 23 without affecting operation of the scan processor 33. Unsolicited messages can also be received directly in the image table 32, but this requires interruption of the scan processor 33. Typically messages are first placed directly into the ENIM mailbox register 39 and then are moved into the image table 32 at predetermined times by the scan processor 33. Only critical unsolicited messages, such as a stop bit to stop the scan processor 33, are placed directly into the image table 32.

Figure 2:
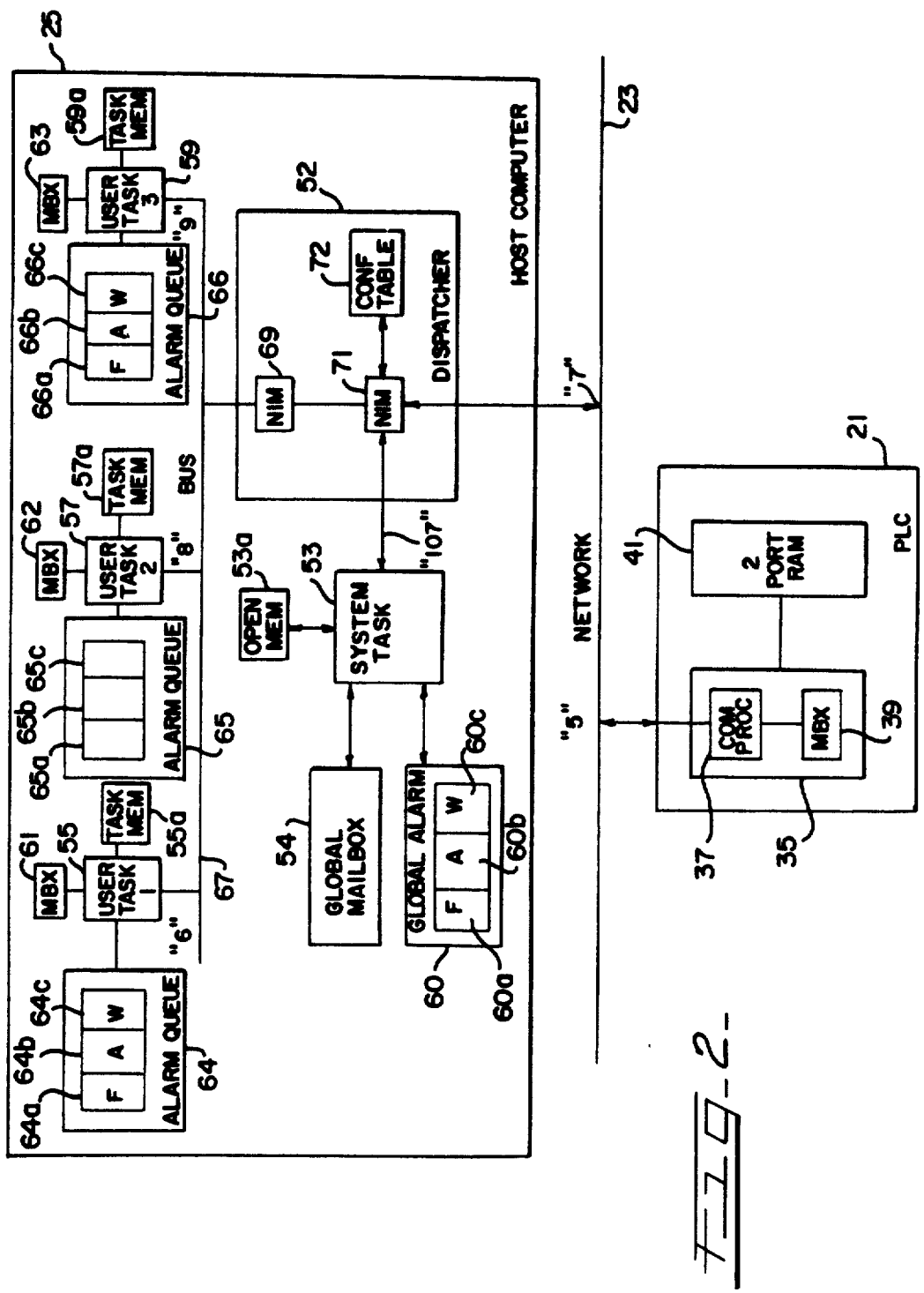
FIG. 2 is a more detailed block diagram illustrating software architecture of a host computer and a PLC, each coupled to the high-speed data communications network.

Software architecture of the host computer 25 as viewed by a user is illustrated in FIG. 2.

As indicated above, traditionally a PLC required a network interface module (NIM) to communicate over a high-speed data communications network. Such a NIM typically had only a single high-speed port, adaptable to communicatively couple to the network, and a serial port. Thus, in order to communicate between two networks, two separate NIMs were required so that each of the two high-speed ports could be coupled to a respective one of the networks. The two NIMs would then be jointly coupled by their serial ports. According to the invention, the host computer 25 is provided with software architecture including a network to network (net-to-net) software bridge which permits PLCs and other similar devices coupled to the communications network 23 to communicate directly with user tasks within the host computer 25 as though the user tasks were simply other PLC's on the communications network 23. Accordingly, such other PLC's are able to request data from the user tasks while the user tasks are running.

As discussed above, host computers have been able to poll specific PLCs coupled thereto for information, though such polling has required either interruption of the PLC's scan cycle, or waiting for completion of the PLC's scan cycle. However, these traditional host computers have been unable to obtain unsolicited messages from a PLC. Further, a host computer typically concurrently runs a plurality of user tasks. Sometimes it is desirable for unsolicited information from a PLC to be available for all of these concurrently running user tasks. At other times, it is desirable that the unsolicited information be available for only one, or a limited number, of these concurrently running user tasks.

Accordingly, the host computer 25 illustrated in FIG. 2 operatively includes software architecture comprising a dispatcher (or software bridge) 52, a system task 53, system task operating memory 53a, a global mailbox register 54, and first, second and third user tasks 55, 57 and 59, respectively. Three user tasks 55, 57 and 59 are disclosed herein for illustrative purposes; however, it is to be understood that any number of such user tasks could be used without departing from the spirit and scope of the invention. The dispatcher 52 accepts and routes data transfers between the user tasks 55, 57 and 59, the system task 53 and other devices on the communications network 23. The dispatcher 52 thus acts as an intermediary between the system and user tasks 53, 55, 57, 59, and the physical communication channel operating as the communications network 23 in a manner transparent to the system and user tasks 53, 55, 57, 59.

The host computer 25 further includes a global alarm queue 60. Specifics of the software architecture are discussed below with respect to FIG. 3.

As viewed in FIG. 2, each of the first, second and third user tasks, 55, 57 and 59 includes respective first, second and third user task operating memory 55a, 57a, 59a, wherein operating data is stored, as is well known. Each of the first, second and third user tasks, 55, 57 and 59 further includes respective first, second and third user task mailbox registers 61, 62, 63, and a respective first, second, and third alarm queue 64, 65, 66. Each of the first, second and third user tasks 55, 57, 59 is communicatively coupled to the dispatcher 52 by a software bus 67. The dispatcher 52 is a server program and includes first and second network modules 69, 71 and a host configuration table 72. The first and second network modules 69, 71 cooperate as an ENIM between the communications network 23 and the software bus 67. Specifically, the first network module 69 and second network module 71 emulate two back-to-back hardware NIMs which traditionally, as described above, had been used to interconnect two networks. The first and second modules 69, 71, permit the PLCs on the network 23 to communicate with selected ones of the user tasks 55, 57, 59 as though they were just other PLCs.

Devices on the communications network 23 are operatively located at "drops". In order to route a message from one device to another, a routing address is added to the message indicating where the message is from (originating drop number), where the message is going (destination drop number) and the path for the message to get there (routing drop number). For example, the first PLC 21 is located on the communications network 23 at a drop "5", and the host computer 25 is located on the communications network 23 at a drop "7". The first user task 55 is located at a drop "6", the second user task 57 is located at a drop "8", and the third user task 59 is located at a drop "9". The global mailbox register 54 and the global alarm queue 60 are assigned a drop number of 100 plus the drop number of the computer 25, in this case being "107". The global mailbox register 54 and the global alarm queue 60 have the same drop number. Data to be sent to the global mailbox register 39 is distinguished from data to be sent to the global alarm queue 60 by the particular register address.

The task mailbox registers 61, 62, 63, and their respective alarm queues 64, 65, 66, are assigned the drop number of their respective device. For example, the first user task mailbox register 61 is located at drop number "6". Therefore, the first user task mailbox register 61 and the first user alarm queue, have the drop number "6". As with the global mailbox register 54 and the global alarm queue 60, the user task mailbox registers 61, 62, 63 have the same drop numbers as their respective user alarm queues 64, 65, 66. Data to be sent to one of the user task mailbox registers 61, 62, 63 is distinguished from data to be sent to one of their respective user alarm queues 64, 65, 66, by the particular register address.

Two locations in the first PLC 21 are able to receive and store data, that being the mailbox register 39 and the image table 32. In order to route information from the two-port RAM 41 to the global mailbox register 54, one uses the routing address (5, 107). The number "5" of the routing address (5, 107) represents the location of the origination of the data, in this case being the device coupled to drop number "5". The number "107" of the routing address (5, 107) is the address of the global mailbox register 54.

The ENIM mailbox registers of the individual PLCs on the communications network 23, such as the mailbox register 39 of the first PLC 21, are assigned an address number "200". When routing data to a particular ENIM mailbox register, such as the mailbox register 39, the number "200" precedes the drop number of its respective drop location. For example, if data is to be transferred from the first user task 55, to the mailbox register 39, the routing would be (6, 7, 200, 5). The number "6" of the routing address (6, 7, 200, 5) indicates the location of the origination of the message, in this case being the drop number of the first user task 55. The number "7" of the routing address (6, 7, 200, 5) represents the exit from the software bus 67. The number "200" of the routing address (6, 7, 200, 5) indicates that the data is going to a PLC mailbox register, and the number "5" of the routing address (6, 7, 200, 5) indicates that it is the PLC mailbox register of the PLC coupled to drop number "5".

If unsolicited register data is to be available for each of the user tasks 55, 57, 59, the message is routed to, and stored in, the global mailbox register 54. However, if the unsolicited register data is only for one of the user tasks, such as the first user task 55, the message is directed to the first user task mailbox register 61. Similarly, if the message is for a selected, limited number, though not all, of the user tasks, the unsolicited register data would be sent to the mailbox registers of the selected, limited number of the user tasks. Similarly, the first PLC 21 or other similar devices on the communications network 23 can also obtain data from the individual user task mailbox registers 61, 63, 65, or the global mailbox register 54. Software resident in the host computer 25 supports the user task mailbox registers 61, 62, 63 and the global mailbox register 54.

The user task mailbox registers 61, 62, 63, are requested and specified when the respective user task first connects to the dispatcher 52. The host configuration table 72 is a block of 1000 registers coupled to the second network module 71. As indicated above, the first network module 69 and second network module 71 emulate two back-to-back hardware NIMs. Therefore, as with the ENIM 35, the host configuration table 72 has an address of "200" followed by the drop number of its respective drop location, which in this case would be (200,7). The host configuration table 72 specifies protocol data, such as response time-outs, retries and the like.

Measures such as slave response timeouts, reply timeouts and message retries are utilized to limit the inherently non-deterministic nature of the Ethernet network. These measures allow a user to specify a maximum time to wait for a message to be delivered, or a reply to be received, without error, effectively providing deterministic behavior on the network.

Each of the user tasks 55, 57, 59 can have up to 8192 user task registers numbered in the range 0001-8192. Three of the registers from each of the user tasks 55, 57, 59, form the respective alarm queues 64, 65, 66, and the remainder of these user task registers from each of the user tasks 55, 57, 59, form the respective user task mailbox registers 61, 62, 63. The particular mailbox register numbers are specified by its respective user task. Start and end register numbers of start and end registers can be anywhere in the range, if fewer than 8192 registers are needed. For example, 1000 mailbox registers could be numbered 1234-2233, if desired.

Each of the user tasks 55, 57, 59 can access its own respective mailbox register 61, 62, 63 in either of two ways, specifically by (1) indexing into an array or (2) with read/write register commands.

Indexing into an array is the most efficient way, as it is the user task's own mailbox register which is being read. Accordingly, the particular one of the user tasks 55, 57, or 59 specifies memory blocks in random access memory (RAM) of the host computer 25. These specified memory blocks are used as mailbox registers, and the particular user task can access the specified memory blocks as an array of 16-bit register values. In the example above (mailbox registers 1234-2233), the user task reads its mailbox register 1235 by reading the second word of the register array (memory block).

The second way of accessing a user task's own mailbox register is similar to reading any other mailbox register in that a read/write register command (a command by a user task to read or write to a particular register) is utilized. This is less efficient than the first way of a user task accessing its own mailbox register, discussed immediately above, as read or write subroutines must first be called. With read/write register commands, an empty route field of a register command (the terminator is the first entry) indicates that reads and writes will refer to the user task's own mailbox registers.

A 2-drop route field in a register command is used to read and write to other task's local mailboxes. A 3-drop route field is used to read the global mailbox 54; the middle number of the 3-drop route field being the drop number of the host computer 25 and the last number of the 3-drop route field being the number "100" plus the drop number of the host computer 25.

The actual software architecture is illustrated in the data flow chart of FIG. 3. The system task 53 architecturally appears simply as another one of the user tasks, thus the following discussion with respect to the first user task 55 applies as well to the system task 53. Reference numbers common to FIG. 2 have been maintained.

Messages from one of the user tasks 55, 57, or 59 to another of the user tasks 55, 57, or 59, or from the communications network 23 or the system task 53 are routed through the dispatcher 52, as follows.

Each of the tasks, user tasks as well as system task, includes a respective per-process mailbox, such as the first per-process mailbox 80 associated with the first user task 55. The per-process mailbox 80 is used as a signaling mechanism to inform the respective tasks that a message is available. Messages sent via the per-process mailbox 80 are simply a prompt; only a few bytes of pertinent data are actually transferred via the per-process mailbox 80. The actual message is placed into and temporarily stored in a communication buffer 82.

The communication buffer 82 performs the function of the software bus 67 (FIG. 2) and is illustrated in FIG. 4. The communication buffer 82 is part of the virtual memory RAM of the host computer 25, which is allocated by the software of the host computer 25 under control of the dispatcher 52. The communication buffer 82 includes reply input queue pointers and command input queue pointers for each of the tasks, user as well as system, such as the first reply input queue pointers 84 and the first command input queue pointers 86 which are associated with the first user task 55. The command input queue pointer 86 stores memory addresses of command messages directed toward the user task 55, and the reply input queue pointer 84 stores memory addresses of reply messages directed toward the user task 55. The respective reply input queue pointers and command input queue pointers operate similarly for their respective tasks. Reply messages have a higher priority than command messages, therefore the communications buffer 82 distinguishes reply messages from command messages so that reply messages can be processed first.

The communications buffer 82 further includes dispatcher queues, specifically dispatcher input queue pointers 88 and free list queue pointers 94. Additionally, the communication buffer 82 includes message buffers 96.

The message buffers 96 are memory locations for storing messages. The dispatcher input queue pointers 88 identify locations in the message buffer 96 for messages received from the various ones of the tasks, user as well as system. The free list queue pointers 94 identify unused (i.e., available) locations in the message buffer 96. Messages received from the communications network 23 are given a higher priority than messages from the tasks to lessen the chance of missing a message from the communications network 23.

Referring again to FIG. 3, the per-process mailbox 80 is simply a VMS (VAX software) mechanism for sending a prompt, indicating that a message is waiting. Data in one of the per-process mailbox interrupts the particular one of the tasks associated with the one of the per-process mailboxes, causing the particular one of the tasks to read the message, command or reply, located at the address stored in its respective reply and/or command input queue pointers in the communications buffer 82.

Messages are similarly transferred from a task to the dispatcher 52. However because the dispatcher 52 does not distinguish between reply and command messages, only one queue is required.

To send a command message from one of the user tasks, the particular user task obtains an available message buffer from the free list queue pointers 94.

To send a reply message from one of the user tasks, the particular user task uses the same buffer which the command message was delivered in. In this way there will never be the situation where there are no free buffers to accept the reply message.

The particular one of the user tasks then writes the message data into the message buffer, and queues the message on the dispatcher input queue pointer 88. If the dispatcher input queue pointer was empty, a prompt is sent to a dispatcher prompt mailbox 98 to indicate a presence of a new message. The dispatcher 52 will process the messages identified in the dispatcher input queue pointer until none are left.

For messages to be transferred from the dispatcher 52 to the communications network 23 (i.e. outbound Ethernet messages), the dispatcher 52 passes the address of the message to an Ethernet driver 97. The dispatcher 52 includes a pending outbound message pointer 52a and an inbound message queue pointer 52b. The pending outbound messages queue pointer 52a identifies message buffer locations for messages to be transmitted on the communications network 23. The inbound message queue pointer 52b identifies message buffer locations for messages to be transferred from the dispatcher 52 to one of the tasks, user as well as system.

The host computer 25 must be able to reliably deliver messages. Messages may not be dropped except for extraordinary circumstances.

When a command message must be delivered to the first user task 55, the dispatcher 52 will queue the command message to the command input queue pointer 86. If the command input queue pointer 86 is empty, a message prompt will be sent to the first user task's 55 per-process mailbox 80. If the first user task's command input queue pointer 86 is not full, the message is queued, and no prompt is sent.

If the particular task specified by the routing address is not connected to the dispatcher 52, an error reply is generated. The error reply is sent to the source of the command message.

One does not want to overwhelm a particular task with commands such that the particular task cannot respond to commands as quickly as they are received, as this conceivably could result in filling all of the available communication buffers, which could then also back-up other ones of the tasks. Although this has not been found to be a problem in practice, it is contemplated that an error command could be generated if such did occur.

Unsolicited messages can be accepted by the tasks, user as well as system. These messages can read and write data to the local mailboxes and write alarms to the local alarm queues Mailbox registers and alarm queues (both local and global) can also be used to implement data sharing between application programs. However, tasks will only respond to alarms, and read/write of the task mailbox registers. Other functions will result in error replies being returned to the sender.

The present invention also provides for prioritization and response to alarms by the host computer 25, both on a global level as well as on a user task level. Alarms on the global level are accessible by any one of the user tasks 55, 57, 59, while alarms on the user task level are only accessible by that particular one of the user tasks 55, 57, 59.

As discussed above, the dispatcher 52 is provided with a global alarm queue 60. The global alarm queue 60 has three levels of alarm sub-queues, specifically a global fault alarm queue 60a for storing global fault alarms, a global alert alarm queue 60b for storing global alert alarms and a global warning alarm queue 60c for storing global warning alarms.

In addition, each of the first, second and third user alarm queues 64, 65, 66 includes three similar user level alarm sub-queues, 64 a,b,c, 65 a,b,c and 66 a,b,c, respectively. Each of the user level alarm sub-queues can receive an alarm of up to 128 16-bit registers.

An alarm queue entry, whether global or user-level, contains the following information:
1. a reference number
2. a time-stamp indicating the time the alarm was received by the host computer 25;
3. a routing address (the route from originator to destination);
4. level of alarm (i.e. fault alarms, alert alarms and warning alarms);
5. a user specified alarm code; and
6. user specified data.

The allowed number of alarms per queue and the number of user data registers is determined by the user, depending upon an anticipated number of alarms as well as available memory. Each of the user tasks 55, 57, 59 can perform the following functions in response to alarms in their own alarm queues as well as the global alarm queue:

1. Read first alarm—get alarm data for 1st (i.e., oldest) alarm in a queue;
2. Read specific alarm—get alarm data for an alarm, specified by the reference number of a particular alarm;
3. Read next alarm—get alarm data for the alarm with a reference number greater than (i.e., newer than) a reference number specified;
4. Clear alarm—delete an alarm from a queue;
5. Clear and acknowledge alarm—acknowledge and delete an alarm from a queue;
6. Clear all alarms—delete all alarms from a queue;
7. Clear and acknowledge all alarms—acknowledge and delete all alarms from a queue;
8. Set alarm notify—set up for task notification on addition/deletion of an alarm to/from a queue; and
9. Read alarm queue information—get information about an alarm queue.

As previously indicated, there are three types (levels) of alarm sub-queues: fault queues; alert queues; and warning queues. In general, the severity of an alarm condition dictates which alarm subqueue the alarm is posted to, with fault alarms being the most severe and warning alarms being the least severe.

An alarm is written to an alarm queue, by another device, by issuing a write-register command to the particular register, based on the queue to be written. In the present embodiment, these "pointer" registers are:
1. register number "8101" for a fault alarm;
2. register number "8102" for an alert alarm; and
3. register number "8103" for a warning alarm.

Thus, a fault alarm to be sent by the PLC 21 at drop number "5" to the first user task alarm queue 64 would have the routing address (5, 7, 6) and would be written to register number 8101.

Generally, an alarm acknowledgement is sent back to the same register, in the device issuing the alarm, as the queue to which the alarm was written, though this can be overridden if the user desires to send an acknowledgement to a different register.

The first register value in the data field of an alarm write-register is an alarm code to be posted, and the remaining register values are support data for the alarm. The amount of support data for a particular alarm is controlled by the user's application and needs and can range from 0 to a user-specified number of registers, up to a maximum of 127 registers. A complete alarm write-register command, such as from the PLC 21, would contain:

1. a routing address from the device sending the alarm to the alarm queue location;
2. an alarm "opcode" indicating an alarm operation to be performed;
3. the sending device's status register address, which does not effect the alarm writing process;
4. the alarm queue register address (8101, 8102, or 8103) as the destination of the write register;
5. the alarm code for the particular alarm; and
6. any support data particularly desired by the user (0 or more user specified registers).

The dispatcher 52 further includes a configuration file 52c comprising a disk file that the dispatcher 52 reads when it starts running to determine a number of operating parameters, such as the drop number of the host computer 25. As indicated above, the drop number of the global alarm queues is the drop number of the host computer 25 plus 100. Therefore, the route of an alarm write operation would have the drop number of the host computer 25 plus 100 as the last route number.

Each alarm queue entry is time-stamped with the current time of the host computer 25 when it is written to an alarm queue. Additionally, each alarm queue entry is given a unique reference number for identification. If an attempt is made to write an alarm to an alarm queue that is already full, a standard error code, such as "alarm buffer full", is returned in a priority-write reply message.

The three global alarm queues 60a, 60b, 60c are specified when the system task 53 is initially started up, usually upon system boot. The length (number of entries) and width (maximum number of support data registers) of these alarm queues are specified in the configuration file 52c and can be modified only by shutting down the dispatcher 52, modifying the configuration file 52c, and restarting the dispatcher 52, such as by re-booting the system. If the length of the global alarm queues is specified as 0, no global alarm queues are created.

Any external device or internal task can write to the global alarm queues, and any internal task can view, clear, and acknowledge alarms from the global alarm queues.

Each of the user tasks 55, 57, 59 has an option of setting up three alarm queues for itself. This is done when the particular one of the user tasks first "connects" to the dispatcher 52. These local alarm queues can only be read by the particular one of the user tasks; however alarms can be sent to the local alarm queues from anywhere on the system. The user task's drop number, which is also specified when the user task connects to the system task 53, is used as the last route number in the route field address of an alarm write operation. The second-last route number is the drop number of the host computer 25.

Any external device or internal task can write to a user task's local alarm queues, but only that particular user task can view, clear, and acknowledge such an alarm.

Any particular one of the user tasks 55, 57, 59 has an option of being "interrupted" when an alarm is added or removed from each of its three alarm queues. Alarm notification can be turned on or off for each of the alarm queues (fault, alert, and warning) and operation type (addition and removal). Global and user task alarm queues are accessed independently.

Alarm addition notifications occur when an alarm is added to a specified queue. Similarly, alarm removal notifications occur when an alarm is removed from a specified queue. This includes when a user task clears an alarm from one of its own queues if it has alarm removal notifications set on that queue.

The user tasks cannot be interrupted while their interrupt routines are executing. Alarm notifications will be stacked, and each call to the interrupt routine will consist of only one notification event.

The "interrupt" takes the form of a user-provided subroutine that is called when any of the desired alarm queue operations takes place. When a user task connects to the dispatcher 52, the particular user task specifies which alarms to interrupt on, plus the interrupt routine address. A default is provided which causes no interrupts to be generated.

The user task can also change the interrupt routine while running, so that changes to the interrupt routine address can be made 'on the fly'. All alarm notification interrupts for a particular one of the user tasks must use the same interrupt routine.

Data passed to the interrupt routine includes:
1. queue location—global or local;
2. queue type—fault, alert, or warning;
3. queue operation—alarm added or alarm removed; and
4. reference number of the alarm.

The reference number of an alarm is useful even if the interrupt is an alarm removal. For example, this would allow an alarm display to remove cleared alarms from a video display screen (not shown) without having to re-read the entire alarm queue contents.

The system task 53 maintains a table of interrupt notification settings for any of the user tasks that require notification of global alarms. The table will accommodate notification information for up to 100 tasks. There can be no more than 100 tasks connected to the system task 53 at any time.

To assure accurate data transmission over the communications network 23, a high performance, positive acknowledgment retransmission communication protocol has been provided. This communication protocol is used by any of the processor based devices on the communications network 23, including the host computer 25, that wish to exchange information.

For each message correctly received by a receiving device, a positive acknowledgment, or "ACK", is returned to a sending device on the communications network 23 sending the message. If the receiving device receives an incorrect message, the receiving device will attempt to send a negative acknowledgment, or "NAK", back over the communications network 23. Both ACKs and NAKs contain a transmission number of the last message successfully received by the receiving device.

To guarantee that a message or its corresponding acknowledgment does not get lost, a timer is provided. The timer determines if the sending device waited long enough for an acknowledgment (ACK) to be returned. The length of time that the sending device waits is user determinable.

The protocol has the following features:

1. A route address. Each device on the communications network 23 that is to communicate with this protocol must have an unique route address. The route address of the PLC 21 is set by using a four-bit rotary switch and four DIP switches located on the PLC 21. For other devices on the communications network 23, the route address can be set by the software of the particular device. The route addresses can range from 00 to 99.

2. A transmission number. Each device that is to communicate with this protocol must keep track of the next transmission number it will send to each of the other devices on the communications network 23. The transmission numbers help insure error-free data transfer. The numbering of the transmission numbers is cyclic, from 0 to 254. The transmission number is initialized at the number 255.

3. Pipelining. Each device that is to communicate with this protocol allows additional messages to be sent while awaiting an acknowledgment of each of the messages previously transmitted. Accordingly, a positive acknowledgement not only confirms that the specified message had been received correctly, it also specifies that all previous unacknowledged messages to the particular device were also received error-free.

4. An "ACK" implied in a "NAK". All acknowledgements contain the transmission number of the last message successfully received from a particular device, thus allowing a negative acknowledgement (NAK) to also provide positive acknowledgments of earlier messages.

Each device on the communications network 23 maintains an address table of known active route addresses as well as Ethernet addresses. The address table is used to correspond the route address of each device with its corresponding Ethernet address.

Ethernet addresses have a length of 48 bits. As specified in IEEE Std. 802.3, the first bit transmitted specifies if the message is for a single device (bit=0) or if the message has a multicast address (bit=1). A multicast address can be received by a plurality of devices on the communications network 23. The second bit transmitted in the Ethernet address is used to distinguish between locally (bit=1) or globally (bit=0) administered addresses. A globally administered address indicates that the following 22 bits have been assigned by the above IEEE standard. All communications with this protocol use globally administered addresses.

The PLC 21 can generate its own Ethernet address, consisting of an assigned block of addresses and a value generated from the rotary and DIP switches. However, the Ethernet addresses of other devices (i.e., host computers or other PLCs unable to generate an Ethernet address) are not automatically known.

There are two methods to obtain the Ethernet addresses that are required to establish communication on the communications network 23. According to the first method, a single multicast (i.e., a message containing a multicast address) CONNECT message is sent over the communications network 23 after start-up. This CONNECT message allows all of the devices that are currently on the communications network 23 to place the Ethernet address of the new device in their respective Address tables.

The devices on the communications network 23 that receive the CONNECT message do not return a response. After they place the source's Ethernet and route address in their Address table, they discard the CONNECT message. The source of the CONNECT message, after sending the CONNECT message, is then able to transmit and receive other messages over the communications network 23.

All devices physically must be connected to the communications network 23 before their Ethernet Driver is installed. If the user fails to follow this procedure, the devices on the communications network 23 will not receive the CONNECT message of a new device. Any device that wishes to communicate with the new device will then need to get the new device's Ethernet address by using a GET ADDRESS command, described below.

With the CONNECT message, only the devices that are currently listening on the communications network 23 will know the Ethernet address of any new device. Consequently, a second method of establishing Ethernet addresses is provided to communicate with this protocol. This second method uses a GET ADDRESS request, a multicast message that is actually a superset of the CONNECT message.

The GET ADDRESS REQUEST is transmitted whenever a first device, already established on the communications network 23, needs to transmit a message to a new device having a route address that has not been established in the Address table of the first device. The GET ADDRESS REQUEST is also received by all devices that are communicating with this protocol. Though each device on the communications network 23 will receive the message, the message will indicate which particular one of the devices should return a response. The remainder of the devices on the communications network 23 store the Ethernet address and route address of the new device in each of their Address tables and discard the message.

The GET ADDRESS REQUEST is only used to establish the addresses of the devices on the communications network 23. The GET ADDRESS REQUEST does not contain any data destined for an end device or task. Once the addresses of the devices on the communications network 23 are established, data can be sent to the end devices or tasks.

The device that responds to the GET ADDRESS REQUEST (the responding device) stores the route address and Ethernet address of the source device issuing the GET ADDRESS REQUEST in its Address table. The responding device then sends a multicast GET ADDRESS RESPONSE. This GET ADDRESS RESPONSE allows all other devices on the communications network 23 to update their Address table with the addresses specified in the GET ADDRESS RESPONSE. The GET ADDRESS REQUEST and GET ADDRESS RESPONSE, as well as all other multicast messages, will not be acknowledged. If a GET ADDRESS RESPONSE is incorrectly received, a timeout will occur and a GET ADDRESS REQUEST will be retried.

In the event the GET ADDRESS RESPONSE is not returned within a timeout period (defined to be the greater of 5 seconds, or 4 times the time that a device should wait for an acknowledgement), the GET ADDRESS REQUEST will be sent again. If, after 8 retries of the GET ADDRESS REQUEST, a GET ADDRESS RESPONSE is still not received, all messages for this route address will be eliminated and, for commands, error responses will be returned to the originating device or task.

When a message that is destined for a device that exists in the Address table needs to be transmitted, the Ethernet address of that device will be used. By using the Ethernet address, only the specified device will receive the message. The first data containing message that will be sent will have a 255 as its transmission number.

Each of the devices on the communications network 23 has a Transmit Queue, a Receive Buffer, and an Unacknowledge Queue dedicated to its Ethernet port. Also, variables for the amount of time a device should wait for an acknowledgement, the next transmission number to be sent, the next transmission number to be accepted, and the number of times a message should be retried must be kept for every route address.

If there is a new message in the Ethernet transmit queue and the device for which the message is destined is defined in the Address table, the following steps should be used:

1. For each new message, a variable for the next transmission number to be sent for the particular route address is placed in the data field of the message. The transmission variable is then incremented and stored back in the device's memory.

2. The retry count is initialized to 0 and is stored in the message.

3. After a message is to be transmitted, a timeout value is calculated from using the current time and the timeout time for the route address the message is intended for. This timeout value is stored along with the message in an unacknowledged message queue.

4. After a message is sent, the Ethernet transmit queue is reexamined to see if there are any other messages for this device. If other messages exist, the transmitter will perform steps 1-3 on new messages (without waiting for an acknowledgment of the original message). The only exception to this step is if there are 254 outstanding messages to a particular device. For this case, the transmitter will be required to hold any new message until an acknowledgement is received to a previous message.

5. After transmitting a message(s), the device needs to examine if a timeout has occurred. This examination continues until either an acknowledgment for the message(s) is received or a timeout error occurs.

6. If a timeout error occurs, or if a NAK is received that is not due to a lack of buffer space, the retry count for this message is examined. If the device has sent the number of retries specified for the destination route address, an error handler is invoked. If the device is to re-send the message, a retry count (located in the message) is incremented and the message is sent again. A timeout error will cause a single message to be retried, provided the retry limit has not been met. A NAK, however, can cause multiple messages to be retried, depending on the transmission number that is sent with the NAK.

When an Ethernet packet is received, it must be examined to determine if it is a new message or an acknowledgment. If the packet is an acknowledgment, the following steps should be used, assuming that the corresponding addresses have been previously placed in the Address table:

1. Examine the transmission number returned in the acknowledgment. For the specific route address, if there is any message in the unacknowledge message queue with an transmission number earlier or the same to what was returned, eliminate the message. The messages that are eliminated have been positively acknowledged by the corresponding device.

2. Examine if the acknowledgment is an ACK or a NAK. If an ACK, processing is complete. If a NAK, determine which message caused the error (returned in the NAK packet). Assuming the retry count has not reached its limit, perform the following:

a. Retry all messages that are in the unacknowledge queue and were transmitted before the message that caused the NAK.

b. Retry the message that caused the NAK if it is still in the unacknowledge queue.

c. If the message that caused the NAK is to be retried, retry messages that are in the unacknowledge queue and were transmitted after the message that caused the NAK. For all NAKs, the reason for the failure is included in the message packet. If the NAK was due to insufficient room in the responding device's buffers, the device which sent the message should not increment its retry count.

If the packet is a message, the following steps are followed. Note that these steps cause an acknowledgement to occur. When any device has both acknowledgements and messages in its Ethernet transmit queue, the acknowledgements are transmitted first. This allows the device that sent the message to either purge the message from its unacknowledge queue (if an ACK was received) or retry the message (if a NAK was received).

1. Check if any errors were generated while the message was received. If an error occurred that indicates unreliable data in the message, purge the message from the buffer.

2. If the message was received without any noted errors, get the route address and the transmission number from the message and compare the next transmission number to be accepted for this route address to the transmission number from the message. If the two values are not the same, return a NAK with the value of the last transmission number accepted and purge the message from the buffer.

3. If the message was received without any errors being noted and the transmission number from the message is the value that was expected (after comparing it against the next transmission number to be accepted for this route address):

a. return an ACK with the transmission number from the message;

b. update the next transmission number to be accepted; and c. process the message.

In order to permit pipelining (the ability to send more than one message without waiting for ACKs to each successive message), discussed above, the description in the above step 3 must be expanded. For pipelining to occur, an ACK must not only confirm that the specified message has been received correctly, but that all previous messages with numbers between the one acknowledged in the last ACK and the one acknowledged by the current ACK have been received correctly. This is accomplished by examining the transmit queue after each new message is received. If an ACK is in the transmit queue for the same device, update the transmission number that is to be sent with the ACK.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A programmable logic controller (PLC) which can receive data on a communications network, said PLC executing an operational program and comprising:

(a) means for storing operating data;

(b) an equivalent network interface module having an interface port for coupling to said communications network, a second port, a communications processor coupled to said interface port and to said second port, and a mailbox register coupled to said communications processor, said mailbox register for storing said data received from said communications network;

(c) means coupled between said operating data storage means and said second port of said equivalent network interface module for transferring said data between said mailbox register and said operating data storage means; and (d) wherein said PLC can receive said data without interruption of said operational program.

2. A system for sharing data between microprocessor based devices, said system comprising:
(a) a data communications network;
(b) a first microprocessor based device including
(c) a scan processor for executing a control program,
(d) a first storing means for storing operating data,
(e) a first equivalent network interface module having a first data transfer means, a first mailbox coupled to said first data transfer means, and a first network interface port, said first network interface port coupled to said communications network, and
(f) a first means coupled between said first storing means and said first data transfer means in said first equivalent network interface module, said first means for transferring data between said first operating data storage means and said first mailbox;
(g) a second microprocessor based device including
(h) a second storing means for storing operating data,
(i) a second equivalent network interface module having a second data transfer means, a second mailbox coupled to said second data transfer means, and a second network interface port, said second network interface port coupled to said communications network, and
(j) a second means coupled between said second storing means and said second data transfer means in said second equivalent network interface module, said second means for transferring data between said second operating data storage means and said second mailbox; and
(k) means for transferring data between said first mailbox and said second mailbox without interrupting the operation of said scan processor in said first microprocessor based device.

3. The system of claim 2 wherein said first microprocessor based device comprises a programmable logic controller.

4. The system of claim 3 wherein said second microprocessor based device comprises a programmable logic controller.

5. The system of claim 3 wherein said second microprocessor based device comprises a host computer.

6. A system for sharing data between microprocessor based devices comprising:
(a) a data communications network;
(b) a first microprocessor based device including
(c) a first control processor,
(d) a first image table,
(e) a first equivalent network interface module having a first communications processor, a first mailbox and a first network interface port, said first network interface port coupled to said data communications network, and said first communications processor coupled between said first mailbox and said first network interface port,
(f) a first multi-port RAM coupled between said first control processor and said first communications processor in said first equivalent network interface module, and
(g) first means for transferring data between said first image table and said first mailbox;
(h) a second microprocessor based device including
(i) a second control processor,
(j) a second image table,
(k) a second equivalent network interface module having a second communications processor, a second mailbox and a second network interface port, said second network interface port coupled to said data communications network, and said second communications processor coupled between said second mailbox and said second network interface port,
(l) a second multi-port RAM coupled between said second control processor and said second communications processor in said second equivalent network interface module, and
(m) second means for transferring data between said second image table and said second mailbox; and
(n) means for transferring data between said first mailbox and said second mailbox.

7. The data sharing system of claim 6 wherein said first and second microprocessor based device comprise programmable logic controllers.

8. A system for transferring data between a programmable logic controller (PLC) and a host computer, said system comprising:
(a) a high speed data communications network;
(b) a programmable logic controller including
(c) a scan processor for executing a control program, said program including generating messages to be sent on said high speed data communications network,
(d) a control processor coupled to said scan processor,
(e) an equivalent network interface module having a communications processor, a random access mailbox coupled to said communications processor, and a first port, said first port coupled to said data communications network and to said communications processor,
(f) a multi-port RAM coupled between said control processor and said communications processor in said equivalent network interface module;
(g) a host computer communicatively coupled to said data communications network, said host computer including
(h) means for executing a plurality of programs responsive to receive message from said programmable logic controller,
(i) means for sensing messages to said programmable logic controller,
(j) a plurality of application programs or tasks, one of said tasks associated with a respective one of said programs, each of said task including a respective mailbox for receiving unsolicited ones of said messages from said programmable logic controller for said particular task,
(k) a dispatcher communicatively coupled between said high speed communications network and said tasks, and
(l) a global mailbox coupled to said dispatcher, said global mailbox for receiving unsolicited ones of said messages from said programmable logic controller directed to said global mailbox for use by any of said task;
(m) wherein said PLC can receive messages from said host computer without interrupting the execution of said PLC programs by said scan processor; and
(n) wherein said host computer can receive messages from said PLC without interrupting the execution of said plurality of computer programs.

9. In a system comprising a programmable logic controller (PLC) executing a control program, a host computer executing a plurality of application programs, and a data communications network coupling said PLC and said host computer, an improvement for permitting transfer of unsolicited data between said PLC and said host computer without interrupting the execution of either said control program or said application programs, said improvement wherein:

(a) said programmable logic controller includes a random access mailbox for receiving unsolicited messages from said host computer; and (b) said host computer includes a mailbox for receiving unsolicited messages from said PLC.

* * * * *